(12) United States Patent
Tian et al.

(10) Patent No.: US 8,891,011 B2
(45) Date of Patent: Nov. 18, 2014

(54) SYSTEMS AND METHODS FOR COMBINING DEINTERLACING AND FRAME RATE DECIMATION FOR VIDEO FORMAT CONVERSION

(75) Inventors: Tao Tian, San Diego, CA (US); Vijayalakshmi R. Raveendran, San Diego, CA (US); Fang Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1746 days.

(21) Appl. No.: 11/843,967

(22) Filed: Aug. 23, 2007

(65) Prior Publication Data

US 2009/0051810 A1 Feb. 26, 2009

(51) Int. Cl.
*H04N 7/01* (2006.01)
*H04N 21/4402* (2011.01)

(52) U.S. Cl.
CPC ..... *H04N 21/440281* (2013.01); *H04N 7/0112* (2013.01); *H04N 7/012* (2013.01)
USPC .......................................................... 348/448

(58) Field of Classification Search
CPC .............................. H04N 7/0115; H04N 7/012
USPC .......................................................... 348/197
See application file for complete search history.

(56) References Cited

U.S. PATENT DOCUMENTS

| 5,313,281 | A | * | 5/1994 | Richards .................. 348/443 |
| 5,473,383 | A | | 12/1995 | Sezan et al. |
| 5,521,644 | A | | 5/1996 | Sezan et al. |
| 5,689,305 | A | | 11/1997 | Ng et al. |
| 5,793,435 | A | | 8/1998 | Ward et al. |
| 6,191,824 | B1 | | 2/2001 | Ogawa |
| 6,348,949 | B1 | | 2/2002 | McVeigh |
| 7,119,837 | B2 | | 10/2006 | Soupliotis et al. |
| 7,154,556 | B1 | | 12/2006 | Wang et al. |

(Continued)

FOREIGN PATENT DOCUMENTS

| EP | 9720371 | 7/1996 |
| GB | 2280080 A | 1/1995 |

(Continued)

OTHER PUBLICATIONS

International search Report, PCT/US2008/074082, International Searching Authority European Patent Office, Dec. 1, 2008.

(Continued)

*Primary Examiner* — Richard Torrente
(74) *Attorney, Agent, or Firm* — Timothy E. Buckley; Elaine H. Lo

(57) ABSTRACT

A method of converting video data to film data may include deinterlacing video data from a first field and a third field to produce first field video data, providing second field video data, and merging the first field video data and the second field video data to produce first frame video data. The method may further include copying video data from a fourth field and a fifth field to produce second frame video data. An apparatus for converting video data to film data may include a first deinterlacer for deinterlacing video data from a first field and a third field to produce first field video data and a copy module for providing second field video data and merging the first field video data and the second field video data to produce first frame video data.

60 Claims, 3 Drawing Sheets

(56) References Cited

U.S. PATENT DOCUMENTS

| | | | |
|---|---|---|---|
| 7,167,199 | B2 | 1/2007 | Soupliotis et al. |
| 7,202,907 | B2 | 4/2007 | Chow |
| 7,256,835 | B2 | 8/2007 | Jiang et al. |
| 7,468,757 | B2 | 12/2008 | Wyman |
| 2002/0150160 | A1* | 10/2002 | Liu et al. .................. 375/240.16 |
| 2004/0001705 | A1 | 1/2004 | Soupliotis et al. |
| 2004/0233326 | A1 | 11/2004 | Yoo et al. |
| 2005/0168634 | A1 | 8/2005 | Wyman et al. |
| 2005/0270415 | A1 | 12/2005 | Jiang et al. |
| 2006/0187342 | A1 | 8/2006 | Soupliotis et al. |
| 2006/0187346 | A1 | 8/2006 | Soupliotis et al. |
| 2006/0187359 | A1 | 8/2006 | Soupliotis et al. |
| 2006/0290821 | A1 | 12/2006 | Soupliotis et al. |
| 2008/0094505 | A1* | 4/2008 | Pai et al. ........................ 348/452 |
| 2010/0128171 | A1* | 5/2010 | Yasuoka et al. ............... 348/452 |

FOREIGN PATENT DOCUMENTS

| | | |
|---|---|---|
| JP | H0622210 A | 1/1994 |
| JP | 07050814 | 2/1995 |
| JP | 2004200994 A | 7/2004 |
| JP | 2004350281 A | 12/2004 |
| WO | 2005107266 | 11/2005 |
| WO | WO 2007032479 A1 * | 3/2007 |

OTHER PUBLICATIONS

Written Opinion, PCT/US2008/074082, International Searching Authority, European Patent Office; Dec. 1, 2008.

European Search Report—EP08006432—Search Authority—The Hague—Feb. 16, 2010.

* cited by examiner

SYSTEMS AND METHODS FOR COMBINING DEINTERLACING AND FRAME RATE DECIMATION FOR VIDEO FORMAT CONVERSION

BACKGROUND

1. Field

The invention relates to video format conversion. More particularly, the invention relates to combining deinterlacing and frame rate decimation for video format conversion.

2. Background

In the 1990s, television technology for representing and transmitting video moved from using analog methods to digital methods. A well known process in video format conversion is Telecine, which is the process of transferring a motion picture film (e.g., a 24 frames-per-second movie) into a digital video format (e.g., a 60 fields-per-second National Television Systems Committee (NTSC) video). The word Telecine is derived from a combination of the words "television" and "cinema." Telecine enables a motion picture, captured originally on film, to be converted to a video format so that it can be viewed using standard video equipment such as computers and televisions. Hence, distributors and producers of motion pictures can release their films on video using Telecine.

Reverse or inverse Telecine is used to convert the digital video format to the motion picture film format. The inverse Telecine process involves converting a 60 fields-per-second progressive video to a 24 frames-per-second movie. Some benefits of the inverse Telecine process include high-quality non-interlaced display on compatible display devices and the elimination of redundant data for compression purposes. The inverse Telecine process, however, does not allow for the conversion of a 60 fields-per-second interlaced video to a 24 frames-per-second movie.

The conversion of a 60 fields-per-second interlaced video to a 24 frames-per-second movie involves two main steps. The first step is to deinterlace a 60 fields-per-second interlaced video to a 30 frames-per-second progressive video. The second step is to decimate the 30 frames-per-second progressive video to a 24 frames-per-second movie.

The conversion process described above has two main drawbacks. First, the decimation process produces jitters in the video because 24 is not a divisor of 30. The jitters cause an unpleasant viewing experience for the viewer. Second, the deinterlacing process is a computational intensive algorithm that includes motion compensation based techniques. Therefore, there is a need for efficient and innovative systems and methods for converting a 60 fields-per-second interlaced video to a 24 frames-per-second movie.

SUMMARY

In one embodiment, a method of converting video data to film data may include deinterlacing video data from a first field and a third field to produce first field video data, providing second field video data, and merging the first field video data and the second field video data to produce first frame video data. The method may further include copying video data from a fourth field and a fifth field to produce second frame video data.

In one embodiment, an apparatus for converting video data to film data may include a first deinterlacer for deinterlacing video data from a first field and a third field to produce first field video data and a copy module for providing second field video data and merging the first field video data and the second field video data to produce first frame video data.

In one embodiment, a machine-readable medium comprising instructions for converting video data to film data may include instructions that upon execution cause a machine to deinterlace video data from a first field and a third field to produce first field video data and provide second field video data and merge the first field video data and the second field video data to produce first frame video data.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements. In addition, the first digit of each reference number indicates the figure in which the element first appears.

Figure 1:
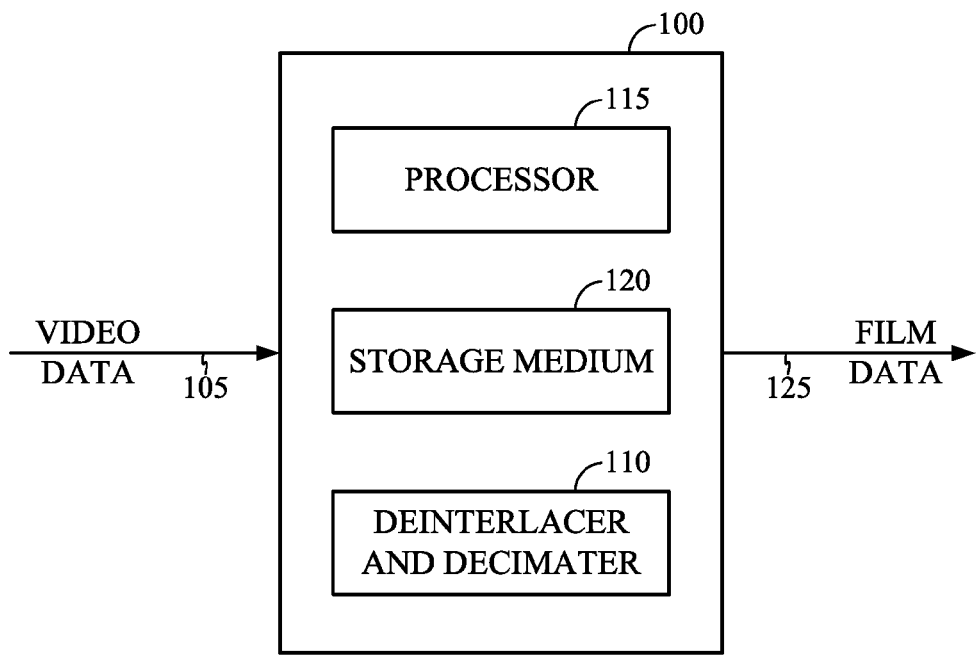
FIG. 1 is a block diagram of a processing system for processing multimedia data.

FIG. 1 is a block diagram of a processing system 100 for processing multimedia (e.g., video, audio or both) data. The terms "video data" may include "multimedia data" for purposes of this disclosure. Processing system 100 may be configured to perform format conversion from video data to film (e.g., movie) data. Processing system 100 may include a deinterlacer and decimater 110, a processor 115 and a storage medium 120. Processing system 100 may be a computer, a digital video recorder, a DVD player, a handheld device (e.g., a cell phone, Blackberry, iPhone, etc.), a set top box, a television, and other devices capable of receiving, processing (e.g., format conversion) and/or displaying a series of video fields and frames.

Processing system 100 may be used to illustrate the methods described below for the format conversion of multimedia data. Processing system 100 may be implemented by hardware, software, firmware, middleware, microcode, or any combination thereof. One or more elements can be rearranged and/or combined, and other systems can be used in place of processing system 100 while still maintaining the spirit and scope of the invention. Additional elements may be added to processing system 100 or may be removed from processing system 100 while still maintaining the spirit and scope of the invention.

Deinterlacer and decimater 110 and/or processor 115 may be configured to receive multimedia data in the form of a series of input fields and/or frames. For example, the video data from the series of input fields may have already been decoded. Deinterlacer and decimater 110 and/or processor 120 may be an Advanced RISC Machine (ARM), a controller, a digital signal processor (DSP), a microprocessor, or any other device capable of processing data. Deinterlacer and decimater 110 and/or processor 115 may convert the video data to film data and/or transmit the multimedia data to storage medium 120 for storage. Storage medium 120 may store computer instructions that are used by deinterlacer and decimater 110 and/or processor 115 to control the operations and functions of deinterlacer and decimater 110 and/or processor 115. Storage medium 120 may represent one or more devices for storing the multimedia data and/or other machine readable mediums for storing information. The term "machine readable medium" includes, but is not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data.

Deinterlacer and decimater 110 and/or processor 115, using computer instructions received from storage medium 120, may be configured to perform both parallel and serial processing (e.g., format conversion) of the series of video fields and frames. The series of video fields and frames can be stored in storage medium 120. Processor 115 is configured to display the series of video fields or frames. The computer instructions may be implemented as described in the methods below.

Figure 2:
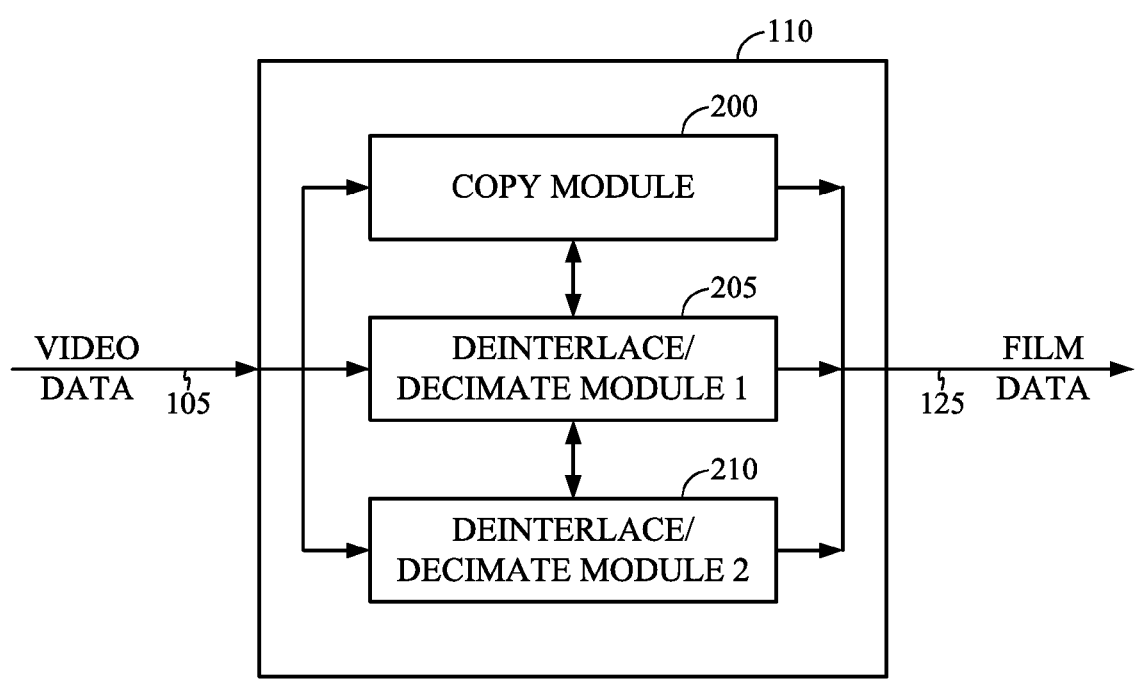
FIG. 2 is a block diagram of a deinterlacer and decimater for the conversion of interlaced video data to film data.

FIG. 2 is a block diagram of a deinterlacer and decimater 110 for the conversion of interlaced video data 105 to film data 125. Deinterlacer and decimater 110 may include a copy module 200, a first deinterlace/decimate module 205 having a first deinterlace and decimate algorithm and a second deinterlace/decimate module 210 having a second deinterlace and decimate algorithm. In one embodiment, the first deinterlace and decimate algorithm has a higher computational intensity than the second deinterlace and decimate module. For example, the first deinterlace and decimate algorithm may implement motion compensation and motion estimation and the second deinterlace and decimate algorithm may implement weighted median filters. Copy module 200 is coupled to first deinterlace/decimate module 205, which is coupled to second deinterlace/decimate module 210.

Figure 3:
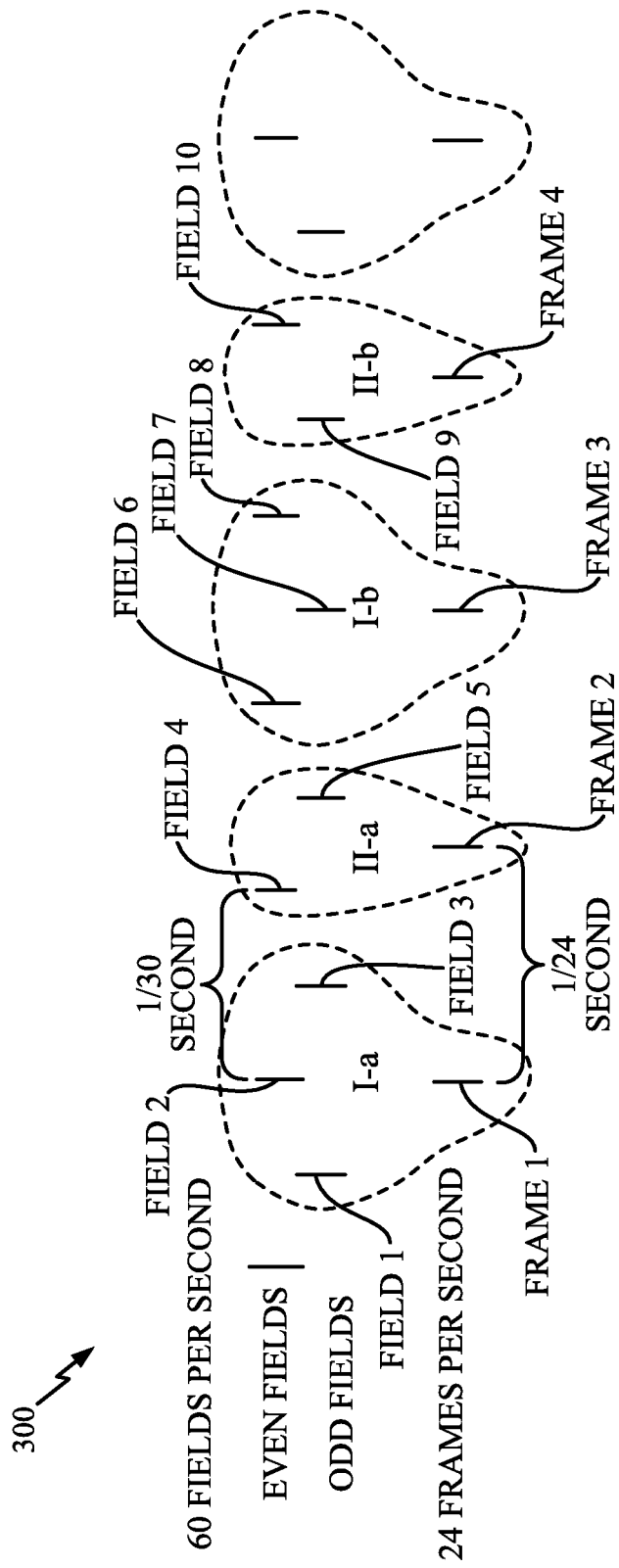
FIG. 3 is a timeline of the video fields before the format conversion and the video frames after the format conversion.

FIG. 3 is a timeline 300 of the video fields before the format conversion and the video frames after the format conversion. The upper portion of timeline 300 shows the video fields and the lower portion of timeline 300 shows the video frames. The x-axis shows fields and frames and the y-axis shows time in seconds. As an example, the fields are shown at a rate of 60 fields per second and the frames are shown at a rate of 24 frames per second. Video data 105 is received by deinterlacer and decimater 110 in the form of a stream of bits. The stream of bits may be grouped or organized as a number of video fields. Video data 105 is shown as interlaced video data, which is alternating fields of even and odd lines. The fields are records of the television camera's image that are $\frac{1}{60}$ second apart. Two adjacent even fields and two adjacent odd fields are $\frac{1}{30}$ second apart. By contrast, film data is shot at 24 frames per second, each frame being a complete image.

Figure 4:
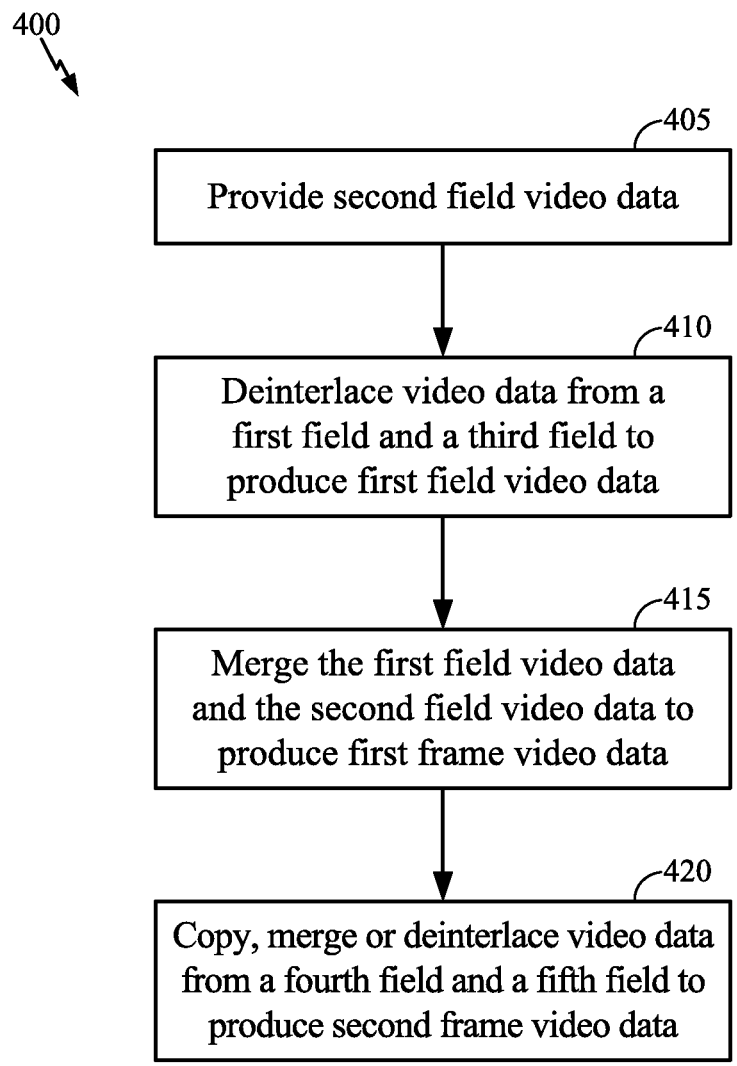
FIG. 4 is a flow chart of a method of converting interlaced video data to film data.

FIG. 4 is a flow chart of a method of converting interlaced video data 105 to film data 125. The method combines deinterlacing and decimation and simplifies the deinterlacing and decimation process to reduce processing time and increase efficiency. The method described herein reduces jitters in field timing and in converting 60 fields per second video to 24 frames per second video. Also, the computational complexity is reduced by about 50 percent or more in terms of deinterlacing costs and efficiency. To illustrate the advantage, a conventional deinterlacing algorithm needs to deinterlace 30 fields per second out of the 60 input fields. The method described herein only needs to deinterlace 24/2=12 fields.

FIGS. 3 and 4 are described together herein to illustrate the features and advantages of the invention.

For illustrative purposes, the fields and frames of FIG. 3 have been labeled and have been divided into 2 main groups, which are I and II. Each group uses a different deinterlace and decimate algorithm to process the fields. For example, group I fields may be processed using the first deinterlace and decimate algorithm and group II fields may be processed using the second deinterlace and decimate algorithm.

Referring to group I-a, since field 2 occurs at the same time as frame 1, copy module 200 provides or receives second field video data (block 405). In one embodiment, copy module 200 copies all even (or odd) lines of video data from field 2 to produce second field video data and sends the second field video data to first deinterlace/decimate module 205. Field 1 and field 3 are $\frac{1}{30}$ second apart and are of the same parity. First deinterlace/decimate module 205 deinterlaces, using for example the first deinterlace and decimate algorithm, all odd (or even) lines of video data from field 1 and field 3 to produce combined odd (or even) lines of first field video data (block 410). Since artifacts may be produced by the deinterlacing process, a filter (e.g., linear) may be used to remove the artifacts. First deinterlace/decimate module 205 merges all the copied even (or odd) lines of second field video data and all the combined odd (or even) lines of first field video data to produce first frame video data for frame 1 (block 415). Some examples of the first deinterlace and decimate algorithm include weighted median filter and motion compensation based deinterlacer.

Referring to group II-a, field 4 and field 5 are $\frac{1}{60}$ second apart and are of different parity. Since field 4 and field 5 are each $\frac{1}{120}$ second apart from frame 2, copy module 200 can copy and/or merge all previous even (or odd) lines of fourth field video data from field 4 and all subsequent odd (or even) lines of fifth field video data from field 5 to produce second frame video data for frame 2 (block 420). Alternatively, second deinterlace/decimate module 210 may deinterlace using, for example the second deinterlace and decimate algorithm, all previous even (or odd) lines of fourth field video data from field 4 and all subsequent odd (or even) lines of fifth field video data from field 5 to produce second frame video data for frame 2. Since artifacts may be produced by the deinterlacing process, a filter (e.g., linear) may be used to remove the artifacts. Some examples of the second deinterlace and decimate algorithm include linear filter and weave.

The process is repeated for groups I-b and II-b except odd and even fields are switched when compared to groups I-a and II-a. Referring to group I-b, since field 7 occurs at the same time as frame 3, copy module 200 provides, receives or copies all odd (or even) lines of video data from field 7 to produce seventh field video data and sends the seventh field video data to first deinterlace/decimate module 205. Field 6 and field 8 are $\frac{1}{30}$ second apart and are of the same parity. First deinterlace/decimate module 205 deinterlaces, using for example the first deinterlace and decimate algorithm, all even (or odd) lines of video data from field 6 and field 8 to produce combined even (or odd) lines of sixth field video data. First deinterlace/decimate module 205 merges all the copied odd (or even) lines of seventh field video data and all the combined even (or odd) lines of sixth field video data to produce third frame video data for frame 3.

Referring to group II-b, field 9 and field 10 are $\frac{1}{60}$ second apart and are of different parity. Since field 9 and field 10 are each $\frac{1}{120}$ second apart from frame 4, copy module 200 can copy and/or merge all previous odd (or even) lines of ninth field video data from field 9 and all subsequent even (or odd) lines of tenth field video data from field 10 to produce fourth frame video data for frame 4. Alternatively, second deinterlace/decimate module 210 may deinterlace using, for example the second deinterlace and decimate algorithm, all odd (or even) lines of ninth field video data from field 9 and all even (or odd) lines of tenth field video data from field 10 to produce fourth frame video data for frame 4.

In some embodiments of the invention, an apparatus for converting video data to film data is disclosed. The apparatus may include means for deinterlacing video data. The means for deinterlacing video data may be processor 115, deinterlacer and decimater 110, copy module 200, first deinterlace/decimate module 205 and/or second deinterlace/decimate module 210. The apparatus may include means for providing video data. The means for providing video data may be processor 115, storage medium 120, deinterlacer and decimater 110, copy module 200, first deinterlace/decimate module 205 and/or second deinterlace/decimate module 210. The apparatus may include means for copying video data. The means for copying video data may be processor 115, deinterlacer and decimater 110, copy module 200, first deinterlace/decimate module 205 and/or second deinterlace/decimate module 210. The apparatus may include means for merging video data. The means for merging video data may be processor 115, deinterlacer and decimater 110, copy module 200, first deinterlace/decimate module 205 and/or second deinterlace/decimate module 210.

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of converting video data to film data comprising:
    combining video data from a first field and a third field to produce first field video data, by a deinterlacer, wherein the video data comprises no repeated fields resulting from a telecine process, and wherein the first field video data produced from the combining is a field of video data and not a frame of video data;
    providing second field video data by a copy module, wherein the second field video data is not a second frame of video data; and
    merging the first field video data and the second field video data to produce first frame video data, by the copy module.

2. The method of claim 1 wherein providing second field video data comprises copying video data from a second field to produce the second field video data.

3. The method of claim 2 wherein the video data from the second field comprises even lines or odd lines of video data.

4. The method of claim 1 wherein merging the first field video data and the second field video data comprises deinterlacing the first field video data and the second field video data.

5. The method of claim 1 further comprising copying video data from a fourth field and a fifth field to produce second frame video data.

6. The method of claim 5 wherein the video data from the fourth field comprises even lines of video data and video data from the fifth field comprises odd lines of video data.

7. The method of claim 5 wherein the video data from the fourth field comprises odd lines of video data and video data from the fifth field comprises even lines of video data.

8. The method of claim 1 further comprising deinterlacing video data from a fourth field and a fifth field to produce second frame video data.

9. The method of claim 8 wherein combining video data from a first field and a third field is performed using a first algorithm and deinterlacing video data from a fourth field and a fifth field is performed using a second algorithm.

10. The method of claim 9 wherein the first algorithm is at least one of a weighted median filter or a motion compensation based deinterlacer and the second algorithm is at least one of a linear filter or a weave.

11. An apparatus for converting video data to film data comprising:
    a first deinterlacer for combining video data from a first field and a third field to produce first field video data, wherein the video data comprises no repeated fields resulting from a telecine process, and wherein the first field video data produced from the combining is a field of video data and not a frame of video data; and a copy module for providing second field video data, wherein the second field video data is not a second frame of video data, and merging the first field video data and the second field video data to produce first frame video data.

12. The apparatus of claim 11 wherein providing second field video data comprises copying video data from a second field to produce the second field video data.

13. The apparatus of claim 12 wherein the video data from the second field comprises even lines or odd lines of video data.

14. The apparatus of claim 11 wherein merging the first field video data and the second field video data comprises deinterlacing the first field video data and the second field video data.

15. The apparatus of claim 11 wherein the copy module copies video data from a fourth field and a fifth field to produce second frame video data.

16. The apparatus of claim 15 wherein the video data from the fourth field comprises even lines of video data and video data from the fifth field comprises odd lines of video data.

17. The apparatus of claim 15 wherein the video data from the fourth field comprises odd lines of video data and video data from the fifth field comprises even lines of video data.

18. The apparatus of claim 11 further comprising a second deinterlacer for deinterlacing video data from a fourth field and a fifth field to produce second frame video data.

19. The apparatus of claim 18 wherein combining video data from a first field and a third field is performed using a first algorithm and deinterlacing video data from a fourth field and a fifth field is performed using a second algorithm.

20. The apparatus of claim 19 wherein the first algorithm is at least one of a weighted median filter or a motion compensation based deinterlacer and the second algorithm is at least one of a linear filter or a weave.

21. An apparatus for converting video data to film data comprising:

means for combining video data from a first field and a third field to produce first field video data, wherein the video data comprises no repeated fields resulting from a telecine process, and wherein the first field video data produced from the combining is a field of video data and not a frame of video data; and means for providing second field video data, wherein the second field video data is not a second frame of video data, and merging the first field video data and the second field video data to produce first frame video data.

22. The apparatus of claim 21 wherein means for providing second field video data comprises means for copying video data from a second field to produce the second field video data.

23. The apparatus of claim 22 wherein the video data from the second field comprises even lines or odd lines of video data.

24. The apparatus of claim 21 wherein means for merging the first field video data and the second field video data comprises means for deinterlacing the first field video data and the second field video data.

25. The apparatus of claim 21 further comprising means for copying video data from a fourth field and a fifth field to produce second frame video data.

26. The apparatus of claim 25 wherein the video data from the fourth field comprises even lines of video data and video data from the fifth field comprises odd lines of video data.

27. The apparatus of claim 25 wherein the video data from the fourth field comprises odd lines of video data and video data from the fifth field comprises even lines of video data.

28. The apparatus of claim 21 further comprising means for deinterlacing video data from a fourth field and a fifth field to produce second frame video data.

29. The apparatus of claim 28 wherein means for deinterlacing combining video data from a first field and a third field is performed using a first algorithm and means for deinterlacing video data from a fourth field and a fifth field is performed using a second algorithm.

30. The apparatus of claim 29 wherein the first algorithm is at least one of a weighted median filter or a motion compensation based deinterlacer and the second algorithm is at least one of a linear filter or a weave.

31. A non-transitory machine-readable medium comprising instructions for converting video data to film data, the instructions upon execution cause a machine to:

combining video data from a first field and a third field to produce first field video data, wherein the video data comprises no repeated fields resulting from a telecine process, and wherein the first field video data produced from the combining is a field of video data and not a frame of video data; and provide second field video data, wherein the second field video data is not a second frame of video data, and merge the first field video data and the second field video data to produce first frame video data.

32. The non-transitory machine-readable medium of claim 31 wherein instructions to provide second field video data comprises instructions to copy video data from a second field to produce the second field video data.

33. The non-transitory machine-readable medium of claim 32 wherein the video data from the second field comprises even lines or odd lines of video data.

34. The non-transitory machine-readable medium of claim 31 wherein instructions to merge the first field video data and the second field video data comprises instructions to deinterlace the first field video data and the second field video data.

35. The non-transitory machine-readable medium of claim 31 further comprising instructions to copy video data from a fourth field and a fifth field to produce second frame video data.

36. The non-transitory machine-readable medium of claim 35 wherein the video data from the fourth field comprises even lines of video data and video data from the fifth field comprises odd lines of video data.

37. The non-transitory machine-readable medium of claim 35 wherein the video data from the fourth field comprises odd lines of video data and video data from the fifth field comprises even lines of video data.

38. The non-transitory machine-readable medium of claim 31 further comprising instructions to deinterlace video data from a fourth field and a fifth field to produce second frame video data.

39. The non-transitory machine-readable medium of claim 38 wherein to combine video data from a first field and a third field is performed using a first algorithm and to deinterlace video data from a fourth field and a fifth field is performed using a second algorithm.

40. The non-transitory machine-readable medium of claim 39 wherein the first algorithm is at least one of a weighted median filter or a motion compensation based deinterlacer and the second algorithm is at least one of a linear filter or a weave.

41. A handset for converting video data to film data comprising:

a first deinterlacer for combining video data from a first field and a third field to produce first field video data, wherein the video data comprises no repeated fields resulting from a telecine process, and wherein the first field video data produced from the combining is a field of video data and not a frame of video data; and a copy module for providing second field video data, wherein the second field video data is not a second frame of video data, and merging the first field video data and the second field video data to produce first frame video data.

42. The handset of claim 41 wherein providing second field video data comprises copying video data from a second field to produce the second field video data.

43. The handset of claim 42 wherein the video data from the second field comprises even lines or odd lines of video data.

44. The handset of claim 41 wherein merging the first field video data and the second field video data comprises deinterlacing the first field video data and the second field video data.

45. The handset of claim 41 wherein the copy module copies video data from a fourth field and a fifth field to produce second frame video data.

46. The handset of claim 45 wherein the video data from the fourth field comprises even lines of video data and video data from the fifth field comprises odd lines of video data.

47. The handset of claim 45 wherein the video data from the fourth field comprises odd lines of video data and video data from the fifth field comprises even lines of video data.

48. The handset of claim 41 further comprising a second deinterlacer for deinterlacing video data from a fourth field and a fifth field to produce second frame video data.

49. The handset of claim 48 wherein combining video data from a first field and a third field is performed using a first algorithm and deinterlacing video data from a fourth field and a fifth field is performed using a second algorithm.

50. The handset of claim 49 wherein the first algorithm is at least one of a weighted median filter or a motion compensation based deinterlacer and the second algorithm is at least one of a linear filter or a weave.

51. An integrated circuit for converting video data to film data comprising:

a first deinterlacer circuit for combining video data from a first field and a third field to produce first field video data, wherein the video data comprises no repeated fields resulting from a telecine process, and wherein the first field video data produced from the combining is a field of video data and not a frame of video data; and a copy circuit for providing second field video data, wherein the second field video data is not a second frame of video data, and merging the first field video data and the second field video data to produce first frame video data.

52. The integrated circuit of claim 51 wherein providing second field video data comprises copying video data from a second field to produce the second field video data.

53. The integrated circuit of claim 52 wherein the video data from the second field comprises even lines or odd lines of video data.

54. The integrated circuit of claim 51 wherein merging the first field video data and the second field video data comprises deinterlacing the first field video data and the second field video data.

55. The integrated circuit of claim 51 wherein the copy circuit copies video data from a fourth field and a fifth field to produce second frame video data.

56. The integrated circuit of claim 55 wherein the video data from the fourth field comprises even lines of video data and video data from the fifth field comprises odd lines of video data.

57. The integrated circuit of claim 55 wherein the video data from the fourth field comprises odd lines of video data and video data from the fifth field comprises even lines of video data.

58. The integrated circuit of claim 51 further comprising a second deinterlacer circuit for deinterlacing video data from a fourth field and a fifth field to produce second frame video data.

59. The integrated circuit of claim 58 wherein combining video data from a first field and a third field is performed using a first algorithm and deinterlacing video data from a fourth field and a fifth field is performed using a second algorithm.

60. The integrated circuit of claim 59 wherein the first algorithm is at least one of a weighted median filter or a motion compensation based deinterlacer and the second algorithm is at least one of a linear filter or a weave.

\* \* \* \* \*